US006872066B2

(12) United States Patent
Wernz

(10) Patent No.: US 6,872,066 B2
(45) Date of Patent: Mar. 29, 2005

(54) INJECTION MOLDING MACHINE WITH A VERTICALLY DISPLACEABLE CLOSING UNIT

(75) Inventor: Ulrich Wernz, Tuttlingen/Nendingen (DE)

(73) Assignee: Klöckner Desma Elastomertechnik GmbH, Fridingen (DE)

( * ) Notice: Subject to any disclaimer, the term of this patent is extended or adjusted under 35 U.S.C. 154(b) by 89 days.

(21) Appl. No.: 10/033,771

(22) Filed: Dec. 28, 2001

(65) Prior Publication Data

US 2002/0086084 A1 Jul. 4, 2002

(30) Foreign Application Priority Data

Jan. 1, 2001 (DE) .......................................... 101 00 001

(51) Int. Cl.[7] .............................................. B29C 45/64
(52) U.S. Cl. ..................... 425/107; 425/595; 425/451.9
(58) Field of Search ................................ 425/107, 590, 425/595, 451.2, 451.9

(56) References Cited

U.S. PATENT DOCUMENTS

| 3,737,278 A | * | 6/1973 | Putzler ........................ 425/590 |
| 4,484,875 A | * | 11/1984 | Irie et al. ................... 425/451.2 |
| 5,665,405 A | * | 9/1997 | Hettinga ...................... 425/590 |

* cited by examiner

Primary Examiner—James P. Mackey
(74) Attorney, Agent, or Firm—Collard & Roe, P.C.

(57) ABSTRACT

An injection molding machine with a vertically displaceable closing unit, comprises a plate-like lower yoke as the counterpressure plate; a plate-like upper yoke as the stationary mold clamping plate; at least three vertically aligned struts connecting the lower yoke and the upper yoke with each other in a force-locked manner; as well as another plate-like element serving as the displaceable mold clamping plate, which is displaceable on the struts by one or more driving cylinders having a small cross section and a large stroke length. The displaceable mold clamping plate is displaceable by one or more driving cylinders stopped on the displaceable mold clamping plate and on the counterpressure plate, such that molding tool halves arranged on surfaces of the mold clamping plates can be driven from a maximum spacing into a position of mutual abutment, and vice-versa. In the abutting position, a short-stroke cylinder with a larger cross section and acting between the counterpressure plate and the displaceable mold clamping plate can be engaged to generate the required closing pressure. The engageable short-stroke cylinder is a piston-and-cylinder system to which a fluid medium can be admitted. This system can be retracted and extended in the abutting position from the closing unit in the horizontal direction between the counterpressure plate and the displaceable mold clamping plate.

17 Claims, 3 Drawing Sheets

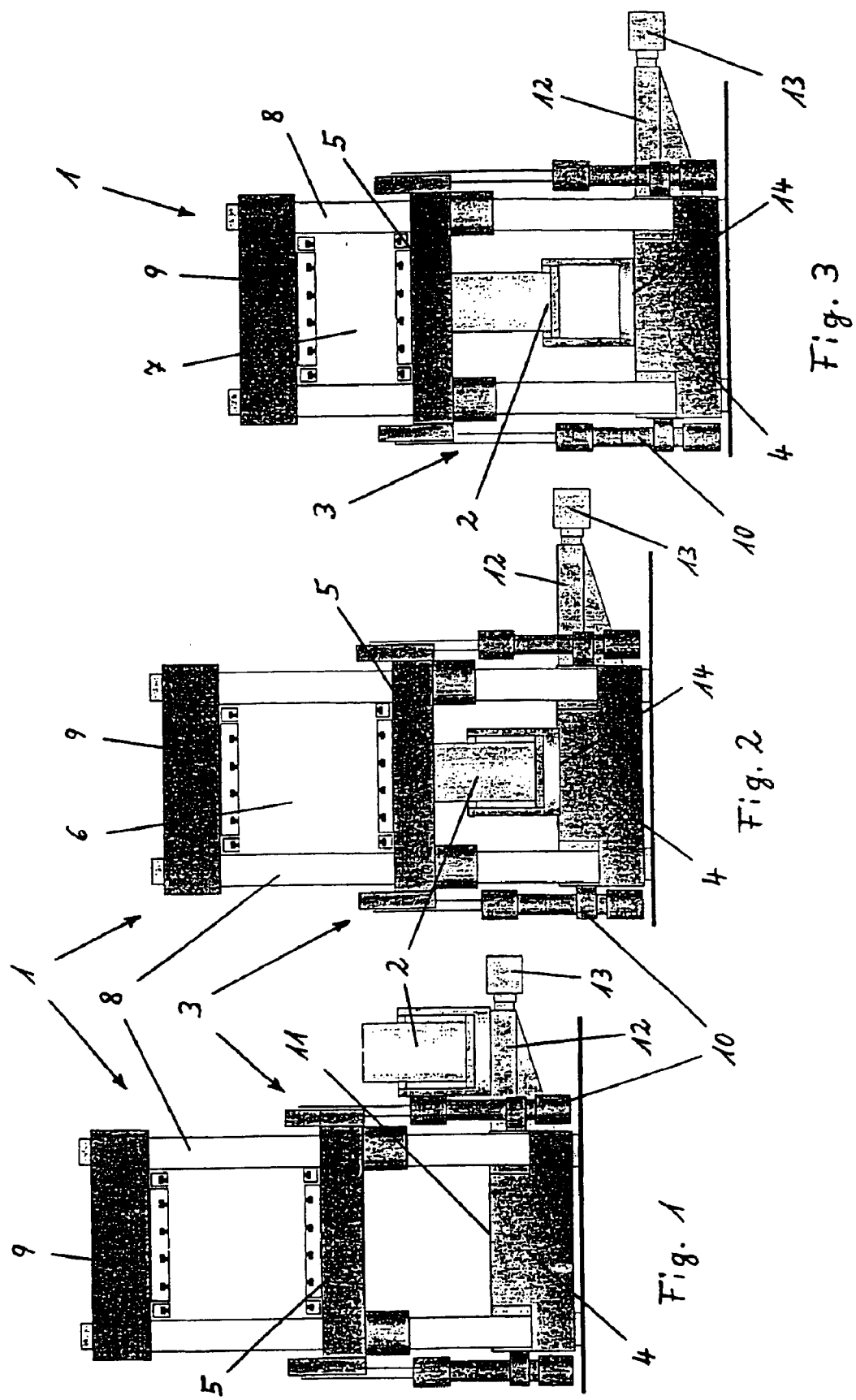

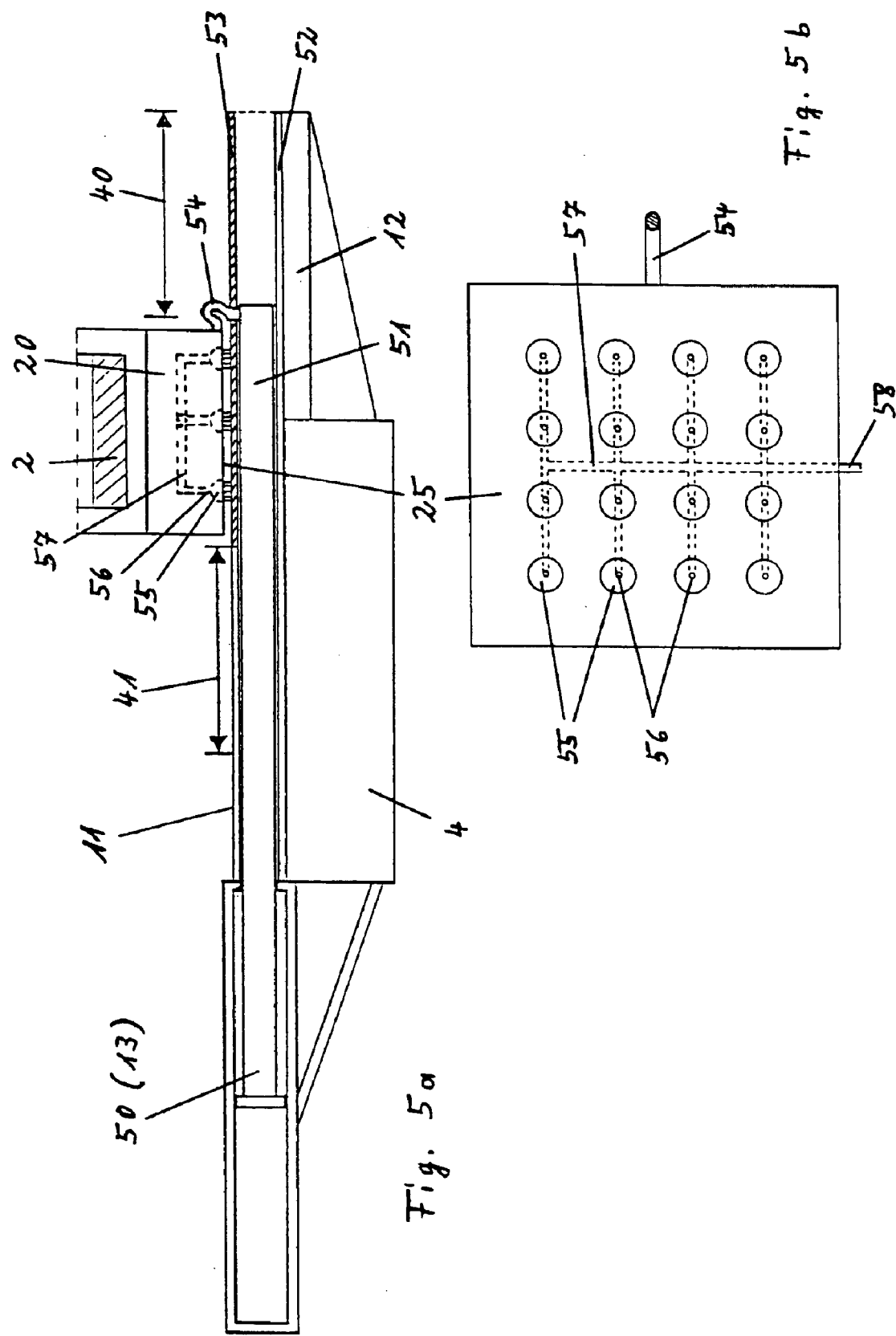

INJECTION MOLDING MACHINE WITH A VERTICALLY DISPLACEABLE CLOSING UNIT

BACKGROUND OF THE INVENTION

1. Field of the Invention

The invention relates to an injection molding machine with a vertically displaceable closing unit.

2. The Prior Art

Over the past decades, it has been found that it is useful in the manufacture of articles made of plastic or rubber mixtures to employ injection molding machines with a vertically displaceable closing unit, so that after the molding tool has been opened, the produced articles will project from the horizontal plane of separation of the tool and can thus be removed from the top. This is advantageous when a multitude of mold clusters for relatively small articles is contained in a molding tool. Because of the shape of such articles, which may comprise undercuts, or because of their material, such articles may occasionally pose problems when they are removed from the clusters of the mold, so that they have to be constantly observed by a member of the operating personnel and, if necessary, then have to be removed by hand with or without the use of special tools, or if the injection molding machine is a component of a production line, along which the manufactured articles are transferred to the next treatment station.

In the simplest case, this is carried out in the form of a displacement or swiveling movement in a horizontal plane extending parallel with the plane of separation of the molding tool, in combination with a lifting movement first and a final depositing movement. Since injection molding machines with vertically displaceable closing units generally require a smaller set-up area than corresponding injection molding machines with a horizontally displaceable closing unit, they can therefore be installed in a more flexible way in an existing production plant building.

Furthermore, with injection molding machines comprising a vertically displaceable closing unit, it is useful if the upper cross head (or yoke) is provided in the form of a stationary mold clamping plate, and to support the displaceable mold clamping plate on the lower yoke, which is designed in the form of the counterpressure plate. The displaceable mold clamping plate is displaced against the stationary mold clamping plate. This offers the advantage that the upper cross head (or yoke) will not have to support the driving units for lifting and lowering the displaceable mold clamping plate, which are driving cylinders and additional devices normally present for generating the closing pressure, so that both the struts and the upper yoke can be constructed less massive in a manner saving material.

However, in such a case, the lower yoke must accommodate stops for the driving cylinders and additional devices for generating the closing pressure. However, it does not require any additional reinforcements for increasing the stability, because it is capable of passing on the stresses caused by the driving cylinders and the generation of the closing pressure directly into the underground. In such a case, the required plasticizing and injection unit is mounted either on or above the stationary mold clamping plate so that it feeds the flowable plastic melt or a flowable rubber mixture into the sprue from the top, which vertically extends in the stationary mold clamping plate, or into some other suitable type of system, or it is driven laterally against the plane of separation of the molding tool in order to inject the flowable plastic melt or a flowable rubber mixture from the side into a system of distribution channels arranged in the plane of separation.

One or more hydraulically actuated driving cylinders with a small cross section and great stroke length are usually employed as driving units for injection molding machines of the type specified above, for lifting and lowering the displaceable mold clamping plate. The ends of the cylinder housings of such driving cylinders facing away from the displaceable mold clamping plate are stopped in or on the marginal zone of the counterpressure plate, and the ends of their piston rods facing away from the counterpressure plate are secured on the displaceable mold clamping plate in a form-locked manner in or on the marginal zone of the plate. In the present case, the closing pressure is then generated by a pressure cushion arranged in the counterpressure plate. According to the state of the art, such a pressure cushion consists of a short-stroke cylinder to which hydraulic fluid is admitted on both sides. This cylinder has a larger cross section and a vertical direction of movement with a maximum deflection in the order of magnitude of hk=50 mm. The piston rod of this cylinder has a horizontal end surface in the form of an attachment which, in the idle position of the pressure cushion, is substantially aligned with the upper area of limitation defining the counterpressure plate.

The pressure cushion specified above is usually temporarily coupled to the displaceable mold clamping plate for producing the closing pressure of the molding tool united by the driving cylinders, by a system having a punch with a predetermined length and adequate stability and connected in a force-locked manner with the underside of the displaceable mold clamping plate and pointing downwards from there. With the displaceable mold clamping plate positioned in the lowered position, the punch immerses in a central bore of the piston and the attachment-like piston rod of the pressure cushion, which forms a ring piston, as well as in a bore in the underside of the counterpressure plate, and, with the displaceable mold clamping plate located in the lifted position, comes to a standstill with its lower horizontal end surface just barely spaced on top from the upper—now ring-shaped—end surface of the attachment-like piston rod. The spacing is such that an adequately stable swinging disk can be folded from the side into the gap between the lower surface of the punch and the upper end surface of the piston rod; or coupled by means of a pressure block, i.e. a punch having a predetermined length and adequate stability as well, which, with the displaceable mold clamping plate in the extended condition, can be swiveled from the side between the underside of the displaceable mold clamping plate and the upper end surface of the attachment-like piston rod of the short-stroke cylinder.

The first-mentioned type of coupling is realized, in machines that employ a punch that has not only a preset length but a constant length as well. If it is desired to adapt the injection molding machine to different molding tool levels in the stationary mold clamping plate, the machine comprises a mechanical type of vertical adjustment that is integrated in the molding clamping plate and effective vis-a-vis the upper ends of the struts. This level adjustment, however, leaves the force-locked connection between the clamping plate and the struts untouched in whichever condition it has been fixed. The second-mentioned type of coupling is employed, for example in molding machines manufactured by the Dieffenbacher Company. However, this type of coupling has been a component already in revolving table-type injection molding equipment employed in the eighties for producing articles from rubber mixtures manufactured by Klöckner Ferromatik Desma GmbH. With the injection molding machines of the Dieffenbacher Company, the machine is adapted to different molding tool levels by mechanically extending or shortening the pressure block by means of a thread that is arranged integrated in the block.

In connection with all injection molding machines of the type described above, however, it was found that due to the integration of the pressure cushion in the counterpressure plate, the total height comprising the counterpressure plate and the lowered displaceable mold clamping plate including the half of the molding tool clamped on the latter, and thus the level at which the molding machine is controlled must not fall short of a preset minimum value in the order of magnitude of hB=1000 mm. This means that the plane of separation of the lowered half of the molding tool and of the produced injection-molded articles projecting from this half of the tool can be ergonomically handled only if the machine is installed in a costly pit, or the person in charge of controlling the machine is required to work standing on a small podium, which is accident-prone because the operator is required to frequently step down from and up again on the podium.

SUMMARY OF THE INVENTION

Therefore, it is an object of the present invention to provide injection molding machines with a vertically displaceable closing unit which, due to the design of their construction, permit a controlling level in the order of magnitude of hB=750 to 800 mm, counting from the base on which the machine is set up, without implementing any additional measures.

The invention comprises an injection molding machine with a vertically displaceable closing unit, comprising a plate-like lower yoke as the counterpressure plate; a plate-like upper yoke as the stationary mold clamping plate; at least three vertically aligned struts connecting the lower yoke and the upper yoke with each other in their marginal zones in a force-locked manner; as well as another plate-like element serving as the displaceable mold clamping plate, which is displaceable on the struts by means of one or more driving cylinders having a small cross section and a large stroke length. The displaceable mold clamping plate is displaceable by means of one or more driving cylinders stopped on the displaceable mold clamping plate and on the counterpressure plate, in a manner such that single- or multi-component molding tool halves arranged on surfaces of the mold clamping plates facing each other can be driven from a maximum spacing into a position of mutual abutment, and vice-versa. In the abutting position, a short-stroke cylinder with a larger cross section and acting between the counterpressure plate and the displaceable mold clamping plate as well, can be engaged for the purpose of generating the required closing pressure.

It was found that it is particularly advantageous in this connection that the engageable short-stroke cylinder is a piston-and-cylinder system to which a fluid medium can be admitted. This system can be retracted and extended in the abutting position from the external space of the closing unit in the horizontal direction between the counterpressure plate and the displaceable mold clamping plate because the counterpressure plate can be designed without any integrated pressure cushion and thus with a distinctly reduced level of height without causing any change in its stability, so that with such a counterpressure plate, in conjunction with a displaceable mold clamping plate that is plane on its underside, and with the lower half of the molding tool locked on the plate, it is in fact possible to obtain a machine controlling level in the order of magnitude of hB=750 to 800 mm above the floor on which the injection molding machine is set up. This does in fact require the installation of an additional arrangement for horizontally retracting and extending the piston-and-cylinder system for generating the closing pressure. However, it reduces not only the height of the counterpressure plate, but substantially simplifies its structure as well, and, furthermore, permits eliminating the mechanism required for pivoting a disk or a pressure block. Such a disk and block can be omitted as well, so that the benefit of an ergonomical controlling level at which the machine is controlled predominates by far.

In a further embodiment, the piston-and-cylinder system, in addition to the stroke volume for producing the short stroke, which can be filled with a fluid medium and drained again for a short time, comprises another volume for initial tensioning, into which varying amounts of the fluid medium are admitted at randomly selectable longer time intervals in order to adapt the initial level of the piston-cylinder system to different molding tool levels for the short-stroke operation. This is advantageous because it permits dispensing with any type of mechanical or also electromechanical device for adapting the injection molding machine to different levels of the molding tool. Such a device may be a system for adjusting the tool level that is integrated in the stationary mold clamping plate, which would require a costly additional treatment of both the mold clamping plate and the upper struts, or also a pressure block that is provided with an integrated thread arrangement.

In another embodiment, the stroke volume and the pre-tensioning volume form a common chamber because this permits a particularly simple and favorably priced manufacture of the piston-cylinder system required for generating the closing pressure and the coupling of the short-stroke cylinder with both the counterpressure plate and the displaceable mold clamping plate. It is possible to define the stroke volume by controlling the amount of fluid medium flowing in and out for producing the short stroke, and hydraulic fluid of the known type can be used. It is, of course, also possible to provide for two separate cylinder chambers for the stroke volume and the initial tensioning volume within the piston-cylinder system, for example in a form such that an additional piston-cylinder system is arranged in the piston rod of the short-stroke piston, serving as the pre-tensioning system.

In another embodiment, the piston-and-cylinder system is retracted into and extended from the closing unit by means of one or more piston-cylinder systems with horizontal longitudinal axes, to which a fluid medium can be admitted. This is a tested and successfully applied method for displacing movable elements comprising a larger mass in a rapid and targeted manner. The transfer of such a method to the present case poses no problems in terms of engineering. The same advantages apply to the embodiments of the present injection molding machine as well, in which the piston-cylinder system can be retracted into and extended from the closing unit by one or more electric motor-driven spindle drives with horizontal longitudinal axes. Such spindle drives are actuated by electric motors, or by means of one or more gear-and toothed racket drives with horizontal axes that are actuated by electric motors as well.

In another embodiment, the lower bottom surface of the piston-cylinder system facing the counterpressure plate is directly displaced on the counterpressure plate and on a support plate extending the top cover surface of the counterpressure plate. This permits a particularly simple and thus favorably priced construction of the elements required for longitudinally guiding and supporting the horizontally displaceable piston-and-cylinder system. The driving elements for retracting and extending the piston-and-cylinder system a priori assure adequate lateral stability, as well as of the horizontal retraction and extension movement. Otherwise, such lateral stability can be achieved in another embodiment of the injection molding machine as defined by the invention as well if the area of the counterpressure plate and the support plate that comes into contact with the lower bottom surface of the piston-and cylinder system is realized in the form of a flat bed.

Furthermore, an advantageous embodiment of the present injection molding machine is obtained if at least the surface of the counterpressure plate and the support plate coming into contact with the lower bottom surface of the piston-and-cylinder system, and/or the lower bottom surface of the piston-and-cylinder system, are subjected prior to their intended application to a surface treatment for reducing the coefficient of friction. Such a treatment will in any case distinctly increase the sliding property of the piston-and-cylinder system, so that either driving elements with lower capacity—which therefore usually also cost less—can be employed for the retracting and extending movement, or higher retracting and extending speeds can be achieved at reduced wear. This advantageous effect can be enhanced even more by feeding a lubricant into the zone located between the counterpressure plate and the support plate, and the lower bottom surface of the piston-and-cylinder system, such feed taking place continuously or discontinuously.

In another embodiment, the lower bottom surface of the piston-cylinder system facing the counterpressure plate is displaced on the counterpressure plate and the support plate by means of wheel- or roller-type elements arranged in the system and/or in or on the counterpressure plate and support plate. Such wheel- or roller-type elements each are supported so that the piston-cylinder system can be set down in its operating position between the counterpressure plate and the displaceable mold clamping plate on the counterpressure plate. The retraction and extension of the piston-cylinder system by means of such wheel- or roller-type elements is substantially facilitated, and the material wear on the bottom surface of the piston-and-cylinder system, as well as on the base plate and the support plate is clearly reduced, apart from the fact that the use of driving elements with lower capacity and lower cost is made possible in the present case as well. The wheel- or roller-type driving elements can be advantageously supported either by hydraulic or pneumatic piston-and-cylinder units with vertical longitudinal axes, or by spring systems with a vertical line of spring action, which are mounted in or on the lower bottom surface of the piston-cylinder system and/or in or on the counterpressure plate and the support plate. The spring force, when loaded only by the weight of the piston-cylinder system for extending the wheel- or roller-type elements, is adequate but permits the piston-cylinder system to be placed on the counterpressure plate when the short-stroke cylinder is engaged, because both easy retraction and extension of the piston-cylinder system and its exact placement on the counterpressure plate in the operating position located between the latter plate and the displaceable mold clamping plate are assured in either case.

Furthermore, in yet another embodiment, the counterpressure plate and the support plate and/or the lower bottom surface of the piston-cylinder system comprise additional guide elements in the form of rails, grooves or roller tracks that cooperate with adapted counter elements in the form of wheel- or roller-type elements, grooves, guide pins or roll-off surfaces, because very good lateral stability of the horizontal retracting and extending movement is achieved in this way, notably also and especially if it is intended to employ the simplest possible and thus favorably priced driving elements within the overall construction. This results in particularly good guidance of the piston-cylinder system, where the piston-cylinder system is advantageously connected within its bottom area via a rigid strutting in a force-locking manner with the piston rod of a horizontally actuated hydraulic or pneumatic piston-and-cylinder device that is guided outside of the cylinder by an adequately smooth tube of the inner wall of the cylinder. This tube is slotted over an adequate length for the passage of the rigid strutting and arranged horizontally in or under the support plate and in the counterpressure plate. This is a known engineering solution for guiding elements moving in an oscillating manner, which requires a minimum of structural elements, especially of moving structural elements to ensure stability.

In another embodiment of the injection molding machine as defined by the invention, the lower bottom surface of the piston-cylinder system comprises pocket-like recesses each accommodating at least one nozzle. These nozzles can be acted upon by a highly pressurized gaseous medium via a conduit system located in the piston-cylinder system, because any friction between the lower bottom surface of the piston-cylinder system and the counterpressure plate or support plate is avoided in this way in the course of the retraction and extension movement, while the piston-cylinder system, however, can be positioned on the counterpressure plate in its operating position between the counterpressure plate and the displaceable mold clamping plate by simply reducing the pressure. It is very advantageous, primarily for cost and safety reasons, if air is used as the gaseous medium because such a measure only requires the installation of a compressor.

In another advantageous embodiment, the piston-cylinder system is mounted on a transport plate and connected to the plate in a force-locking manner, whereby the underside of the transport plate forms the lower bottom surface of the piston-cylinder system. The force-locked connection between the piston-cylinder system and the transport plate is a detachable connection, as this substantially facilitates both the manufacture of the entire piston-and-cylinder system and its maintenance as well, especially because all of the features of the injection molding machine explained above that have to be realized in or on the bottom surface of the piston-and-cylinder system can be installed, replaced or repaired independently of the actual piston-cylinder system.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a side view of an injection molding machine as defined by the invention shown in the idle condition, with the mold clamping plate driven up and the piston-cylinder system in the idle condition outside of the closing unit, shown by a schematic and partially broken representation (the piston-cylinder system is shown cut).

FIG. 2 is a side view of an injection molding machine as defined by the invention, with the retracted piston cylinder system in the operating position between the counterpressure plate and the displaceable mold clamping plate, shown by a schematic and partially broken representation (the piston-cylinder system is shown cut).

FIG. 3 is a side view of an injection molding machine as defined by the invention, showing the piston-and-cylinder system retracted into its operating position between the counterpressure plate and the mold clamping plate, with the molding tool at the level of minimum height, shown by a schematic and partly broken representation (the piston-cylinder system is shown cut).

FIG. 5a is a side view of another embodiment of the piston-cylinder system corresponding with FIG. 4a, but without showing the upper part of the system and the displaceable mold clamping plate; and FIG. 5b is a top view of the lower bottom surface of the piston-cylinder system in FIG. 5a shown on a changed scale.

DETAILED DESCRIPTION OF THE PREFERRED EMBODIMENT

Figure 4A:
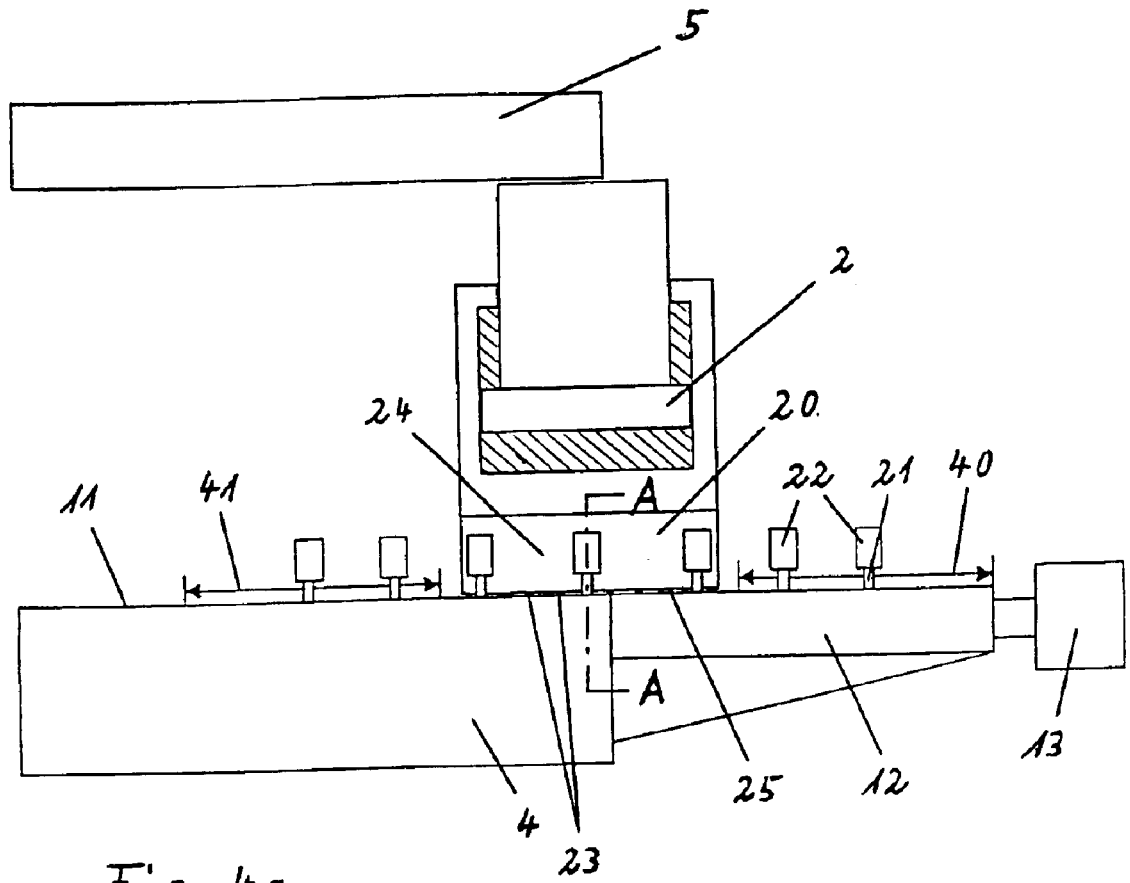
FIG. 4a is a side view of an embodiment of the piston-cylinder system including all elements of the injection molding machine required for retracting and extending the system horizontally, in a position assumed in the course of the retraction and extension movement, shown by a schematic and partly broken representation (the piston-cylinder system is shown cut).

Referring now in detail to the drawings, FIGS. 1, 2 and 3 each show a schematic and partly broken representation (the piston-cylinder system is shown cut) of the side view of an injection molding machine 1 as defined by the invention seen in different operating conditions: once in the starting condition of the novel part of each closing cycle, where the piston-and-cylinder system 2 required for generating the closing pressure is extended from the closing unit 3 into an idle position located outside of the closing unit, and the halves 6 and 7 of the molding tool are already driven apart from the minimal lower position (controlling level hB) required for removing the articles produced, and, on the other hand, in an operating position located between the counterpressure plate 4 and the displaceable mold clamping plate 5 when the molding tool 6 employed is at the maximally possible molding tool level; and, furthermore, in a working position located between the counterpressure plate 4 and the displaceable mold clamping plate 5 when the molding tool 7 employed has the minimally possible molding tool height.

FIGS. 1 to 3 show in an identical manner at least two of the at least three struts 8, which are connected in a force-locked manner with the counterpressure plate 4 forming the lower yoke, and in a force-locked manner with a stationary mold clamping plate 9 forming the upper yoke (or upper cross head). The displaceable mold clamping plate 5 is driven up and down in the vertical direction on plates 4 and 9 by means of at least one driving cylinder 10 (two such driving cylinders are visible in the present case) in the form of long-stroke, preferably but not necessarily hydraulic piston-cylinder units of the known type. The stationary ends of said units each are stopped on the counterpressure plate 4, and the movable ends of said units each are stopped on the displaceable mold clamping plate 5. Furthermore, FIGS. 1 to 3 show a support plate 12 for receiving the piston-cylinder system 2 in its idle position, said support plate extending the top cover surface 11 of the counterpressure plate 4.

The driving unit 13 for the horizontal movement of the piston-cylinder system 2 on the counterpressure plate 4 and the support plate 12 is indicated schematically and can be realized by any measure with which the expert in the field is familiar, for example, by one or more pneumatic or hydraulic piston-cylinder units; by one or more electric motor-driven spindle drives; by one or more electric motor-driven gear-and-racket drives; or also with the help of one or more electric motor-driven cable, chain or toothed-belt systems. An explicit representation of the employed molding tools 6 and 7 is omitted here. These molding tools are indicated in FIGS. 1 to 3 by the net spacing between the displaceable mold clamping plate 5 and the stationary mold clamping plate 9, because these molding tools are elements which are known per se and not essential to the invention in the present case.

With respect to the guidance of the piston-cylinder system 2 on the counterpressure plate 4 and the support plate 12, a common flat bed 14 is formed in the two plates. Other guide elements are shown in detail in FIGS. 4a to 5b described below.

Figure 4B:
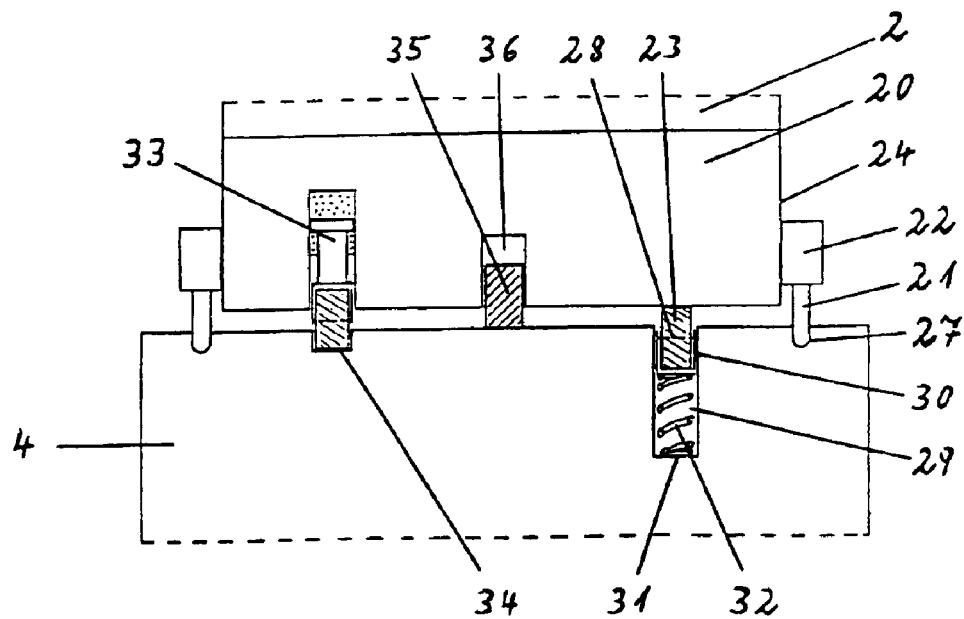
FIG. 4b is the section A—A in FIG. 4a shown by a schematic representation on a changed scale.

FIGS. 4a and 4b show a side view of an embodiment of the piston-cylinder system 2 including all elements of the injection molding machine required for the retracting and extending movement of the system, in a position assumed in the course of the retraction or extension movement and shown by a schematic and partly broken representation (the piston-cylinder system is shown cut). These figures show the section A—A from FIG. 4a by a schematic representation as well, and on a changed scale.

Versus FIGS. 1 to 3, FIG. 4a shows in particular a transport plate 20, on which the original piston-cylinder system 2 is mounted and connected with the transport plate in a force-locked, but detachable manner. Furthermore, FIG. 4a shows a number of the wheel- or roller-type elements 22 rotating about vertical axes, which are supported in the counterpressure plate 4 as well as in the support plate 12; as well as the further wheel- or roller-type elements 23 rotating about axes supported horizontally and vertically in relation to the plane of the drawing. Elements already denoted by reference numerals in FIGS. 1 to 3 disclose identical elements or elements with the same mode of operation as in FIGS. 1 to 3. The same applies in the following with respect to FIGS. 4b to 5b concerning preceding figures as well.

Furthermore, in FIG. 4a, the idle position of the piston-cylinder system 2 outside of the closing unit 3 is shown by arrow 40, and its working position between the counterpressure plate 4 and the displaceable mold clamping plate 5 is shown by arrow 41.

Transport plate 20 primarily serves the purpose of avoiding all measures required for facilitating the extension and retraction movement of the piston-cylinder system 2. In other words, the measures for reducing the friction between the piston-cylinder system 2, on the one hand, and the counterpressure plate 4 and support plate 12 on the other, will not have to be implemented directly on the piston-cylinder system 2, but can be carried out as independently as possible of said system, so that the completion of the overall system following the separate completion (or servicing or repair) of the transport plate 20 will still only require producing a detachable connection between the piston-cylinder system 2 and the transport plate 20. Such a connection itself, however, has not been disclosed explicitly because the expert is familiar with it, and showing it would only reduce the clarity of the drawing.

The wheel- or roller-type elements 22 and each of the side walls of the piston-cylinder system 2 aligned in parallel with the retraction and extension movement of the piston-cylinder system 2, or the associated transport plate 20 (only the front side wall of said side walls and the associated row of the wheel- or roller type elements 22 are visible in the present case), jointly form a lateral guide of the piston-cylinder system 2 for the retraction and extension movement, in a manner such that a roll-off surface 24 is made available by the respective side wall for the associated rows of the wheel- or roller-type elements 22. The type, number and arrangement of the wheel- or roller-type elements 22 within a row is, of course, not fixed by the present FIG. 4a, but may be selected as required by the expert.

In the course of the retraction and extension movement of the piston-cylinder system 2 (including the transport plate 20), the wheel- or roller-type elements 23 reduce the friction between the piston-cylinder system 2 or the transport plate 20, and the counterpressure plate 4 as well as the support plate 12, and form at least one guide means for guiding the lower bottom surface 25 of the piston-cylinder system 2 and the transport plate 20 with adequate spacing above the upper cover surface 11 of the counterpressure plate 4 and the support plate 12, respectively. The wheel- or roller-type elements 23 are advantageously supported in such a manner that the lower bottom surface 25 can be positioned in the working position on the counterpressure plate 4 between the counterpressure plate 4 and the displaceable mold clamping plate 5, as it is shown in detail in the following FIG. 4b.

FIG. 4b, in addition to showing the complete lateral guidance of the piston-cylinder system 2 by combining two rows of the wheel- or roller-type elements 22—whose axle bearing 27 is indicated in this figure only schematically because it is basically known—with the roll-off surfaces 24 of the transport plate 20, shows other possible guide elements for guiding the retraction and extension movement of the piston-cylinder system 2. In practical life, such a multitude of guide elements will certainly not be employed in one single injection molding machine; however, such guide elements are combined here for the purpose of reducing the number of drawings, and for providing a summarizing overview of the possibilities in one illustration.

The guide for guiding the lower bottom surface 25 with a spacing mentioned in connection with FIG. 4a—for which an order of magnitude of $0.1 \text{ mm} \leq a \leq 5 \text{ mm}$ is adequate—above the upper cover surface 11, consists of a system disclosed in the right-hand area of FIG. 4b. Such system comprises a wheel- or roller-type element 23 whose axle 28 is supported by a holding means 30 guided in a shaft located in the counterpressure plate 4 and, respectively, the support plate 12. On its side facing away from the element 23, said holding means in turn can be realized in such a manner that it is interacting with a mechanical spring system 32 supported on the shaft bottom 31. At least within the area of the working position (see arrow 41 in FIG. 4a), the spring force can be adjusted so that when the spring is loaded solely by the weight of the piston-cylinder system 2, including the transport plate 20, the spring will maintain the spacing specified above, but will permit the piston-cylinder system 2 to touch down on the counterpressure plate 4 when the closing pressure is generated by the piston-cylinder system 2. Of course, this arrangement can be installed in the transport plate 20 as well and in that case will roll-off on the top cover surface 11.

The present FIG. 4b shows in the left hand area another possibility for both arranging the guide of the lower bottom surface 25 with a spacing from the upper bottom surface 11 and for laterally guiding it as well. In the present case, the substantial part of the arrangement is accommodated in the transport plate 20. Such accommodation, of course, could be realized in the counterpressure plate 4 and the support plate 12 as well without limiting the generality. The mechanical spring system 32 has been replaced in the present case by a pneumatic or hydraulic piston-cylinder unit 33. Furthermore, the wheel- or roller-type element 23 runs in a groove 34 provided in the upper cover surface 11. With some other type of accommodation (see above), the groove, of course, can be arranged in the transport plate 20 as well.

It is, of course, also possible to combine several of such wheel- or roller-type elements 23 so as to form continuous roller tracks. In such a case, the roller tracks can be jointly mounted with their rearward mechanical spring systems or one or more pneumatic or hydraulic piston-cylinder units in the form of single- or multi-component inserts accommodated in correspondingly dimensioned recesses located in the transport plate 20 or in the counterpressure plate 4 and the support plate 12, respectively.

Guiding the retraction and extension movement of the piston-cylinder system 2 purely laterally can be achieved with the arrangement shown in the center area of the present FIG. 4b. In such a system, a rail 35 arranged on the top cover surface 11 engages a groove 36 provided in the transport plate 20. The level of rail 20 is coordinated with the depth of the groove 36 so that the system comprised of the rail and groove permits the piston-cylinder system 2 to be lowered onto the counterpressure plate 4 at least within the zone of the working position (see arrow 41 in FIG. 4a). Of course, rail 35 can also be mounted on the transport plate 20 and groove 36 can be produced in counterpressure plate 4. Furthermore, it is possible to substitute several individual guide pins for rail 35 without missing the objective of lateral stabilization. The type, number and arrangement of such guide pins can be selected as required by the expert in the field. The same, of course, also applies to any desired combinations of all of the guide elements described above for the horizontal retraction and extension movement of a piston-cylinder system 2.

FIGS. 5a and 5b show the side view of another embodiment of the piston-and-cylinder system corresponding with FIG. 4a, but without its upper part, and the displaceable mold clamping plate as well as a top view of the lower bottom surface 25 of the piston-cylinder system 2 and its transport plate 20 according to FIG. 5a shown on a changed scale.

As opposed to the preceding representations, FIG. 5a discloses as the driving unit 13 a preferably hydraulic piston-cylinder system 50 with a horizontal line of action, which is arranged but is not necessarily mounted on the side of the counterpressure plate 4 disposed opposite the idle position of the piston-cylinder system 2, said idle position being indicated by the symbolical arrow 40. The extended piston rod 51 is guided directly below the top cover surface 11 of the counterpressure plate 4 and the support plate 12, in a tube 52 having an inner wall with adequate smoothness. Tube 52 is designed in the form of a slotted tube 53 over an adequate length between idle position 40 and working position 41. Tube 53 is slit along its uppermost longitudinal line, so that a largely rigid strutting 54 can pass between the piston-cylinder system 2 or the transport plate 20 and the piston rod 51 with free mobility. The rigid connection 54 is designed so that it represents an exact longitudinal guide of the piston-cylinder system 2, but at the same time permits the lower bottom surface 25 to be nonetheless slightly lifted vis-a-vis the top cover surface 11, so that a retraction and extension movement of the piston-cylinder system 2 is made possible with as little friction as possible. It is, incidentally, assumed with respect to the piston-cylinder system 2 that it can be acted upon on both sides as all the other piston-and-cylinder elements specified above, and that it is connected with the respective source of a fluid medium via conduit systems of the known type. Therefore, an explicit representation of such a conduit system has always been omitted in the above descriptions.

The retraction and extension movement of the piston-cylinder system 2 is not only effected with such an arrangement but the system is guided at the same time with lateral stability, employing only a minimal amount of moving components. However, a relatively great length of the entire driving and guiding system has to be accepted in exchange irrespective of whether the piston-cylinder device 50 is arranged on the opposite side of the idle position 40 (as shown), or on the same side as idle position 40 of counterpressure plate 4.

Furthermore, FIG. 5*a* discloses another possibility for reducing the friction between the piston-cylinder system 2 or transport plate 20 and the counterpressure plate 4 or support plate 12, by providing the lower bottom surface 25 of the transport plate 20 with pocket-like recesses 55, in which at least one nozzle 56 is arranged in each pocket. A gaseous medium, preferably highly compressed air, can be admitted under high pressure to nozzle 56 via a line system 57 installed in the piston-cylinder system 2 and the transport plate 20, respectively. A possible arrangement of such pocket-like recesses 55 in the lower bottom surface 25 is shown in FIG. 5*b*, whereby it is possible to modify both the shape and the arrangement of the pocket-type recesses 55 if this is deemed required by the expert. Furthermore, FIG. 5*b* shows a connection fitting 58 via which the conduit system 57 can be connected to an external, preferably flexible feed line for the gaseous medium.

Accordingly, while only a few embodiments of the present invention have been shown and described, it is obvious that many changes and modifications may be made thereunto without departing from the spirit and scope of the invention.

What is claimed is:

1. An injection molding machine with a vertically displaceable closing unit, comprising:
   a plate-like lower yoke as a counterpressure plate;
   a plate-like upper yoke as a stationary mold clamping plate;
   at least three vertically aligned struts connecting the lower yoke and the upper yoke with each other in their marginal zones in a force-locked manner;
   another plate-like element serving as a displaceable mold clamping plate, said another plate-like element being displaceable on the struts;
   one or more driving cylinders for displacing said displaceable mold clamping plate, said cylinders being connected to said displaceable mold clamping plate and the counterpressure plate, in a manner such that single- or multi-component molding tool halves arranged on surfaces of the mold clamping plates facing each other are driven from a maximum spacing into a position of mutual abutment, and vice-versa; and
   a piston-cylinder system acting between the counterpressure plate and the displaceable mold clamping plate for generating a required closing pressure;
   wherein the piston-cylinder system is acted upon by a fluid medium, said piston-cylinder system, in an abutting position, being retractable and extendable in a horizontal direction from an external space of a closing unit (3) between the counterpressure plate (4) and the displaceable mold clamping plate (5), and wherein the piston-cylinder system is adapted to be filled with or drained with the fluid medium to create a stroke volume, and wherein the system is adapted to receive different amounts of the fluid medium at different time intervals as a pre-tensioning volume for generating the closing pressure so as to be able to adapt a starting height of the piston-cylinder system (2) to different heights of the molding tool and wherein a lower bottom surface (25) of the piston-cylinder system (2) facing the counterpressure plate (4) is directly displaced on the counterpressure plate (4) and a support plate (12) extending an upper cover surface (11) of said counterpressure plate and wherein a lower bottom surface (25) of the piston-cylinder system (2) facing the counterpressure plate (4) is displaced on the counterpressure plate (4) and support plate (12) by means of wheel or roller elements (22, 23) mounted on the piston-cylinder system or in or on the counterpressure plate (4) and support plate (12), wherein the wheel- or roller elements (22, 23) each are supported so that the piston-cylinder system (2) is positioned on the counterpressure plate (4) in its working position between the counterpressure plate (4) and the displaceable mold clamping plate (5).

2. The injection molding machine according to claim 1, wherein the machine has one common chamber for receiving the stroke volume and the pre-tensioning volume.

3. The injection molding machine according to claim 1, wherein a hydraulic fluid is used as the fluid medium.

4. The injection molding machine according to claim 1, wherein the piston-cylinder system (2) is retracted into and extended from the closing unit (3) by one or more piston-cylinder units (50) having a horizontal longitudinal axis.

5. The injection molding machine according to claim 1, wherein the piston-cylinder system (2) is retracted into and extended from the closing unit (3) by means of one or more electric motor-driven spindle drives having a horizontal longitudinal axis.

6. The injection molding machine according to claim 1, wherein the piston-cylinder system (2) is retracted into and extended from the closing unit (3) by means of one or more electric motor-driven gear-and-rack drives having a horizontal longitudinal axis.

7. The injection molding machine according to claim 1, wherein a surface of the counterpressure plate (4) and the support plate (12) coming into contact with the lower bottom surface (25) of the piston-cylinder system (2) has the form of a flat bed (14).

8. The injection molding machine according to claim 1, wherein at least a surface of the counterpressure plate (4) and support plate (12) coming into contact with the lower bottom surface (25) of the piston-cylinder system (2), and the lower bottom surface (25) of the piston-cylinder system, are subjected to a surface treatment for reducing the coefficient of friction.

9. The injection molding machine according to claim 1, wherein a lubricant is admitted into an area between the counterpressure plate (4) and support plate (12), and the lower bottom surface (25) of the piston-cylinder system (2).

10. The injection molding machine according to claim 1, wherein the wheel or roller elements (23) are supported by hydraulic or pneumatic piston-cylinder units (33) with vertical longitudinal axes in or on the lower bottom surface (25) of the piston-cylinder system (2) or in or on the counterpressure plate (4) and the support plate (12).

11. The injection molding machine according to claim 1, wherein the wheel or roller elements (23) are supported by spring systems (32) with a vertical line of action, in or on the lower bottom surface (25) of the piston-cylinder system (2) or in or on the counterpressure plate (4) and the support plate (12), with a spring force of such spring systems being adequate for extending the wheel or roller elements (23) when solely loaded by the weight of the piston-cylinder system (2), but permitting the piston-cylinder system (2) to be placed on the counterpressure plate (4) when the piston-cylinder system is actuated.

12. The injection molding machine according to claim 1, wherein the counterpressure plate (4) and support plate (12) or the lower bottom surface (25) of the piston-cylinder system (2) comprise additional guide elements selected from the group consisting of rails (35), grooves (34, 36) and roller tracks (22, 23) cooperating with adapted counter elements selected from the group consisting of wheel or roller elements (22, 23), grooves (34, 36), guide pins and roll-off surfaces (24).

13. The injection molding machine according claim 1, wherein the piston-cylinder system (2) is mounted on a transport plate (20) and connected with said transport plate with a force-locked connection, wherein an underside of the transport plate (20) forms the lower bottom surface (25) of the piston-cylinder system (2).

14. The injection molding machine according to claim 13, wherein the force-locked connection between the piston-cylinder system (2) and the transport plate (20) is detachable.

15. An injection molding machine with a vertically displaceable closing unit, comprising:
a plate-like lower yoke as a counterpressure plate;
a plate-like upper yoke as a stationary mold clamping plate;
at least three vertically aligned struts connecting the lower yoke and the upper yoke with each other in their marginal zones in a force-locked manner;
another plate-like element serving as a displaceable mold clamping plate, said another plate-like element being displaceable on the struts;
one or more driving cylinders for displacing said displaceable mold clamping plate, said cylinders being connected to said displaceable mold clamping plate and the counterpressure plate, in a manner such that single- or multi-component molding tool halves arranged on surfaces of the mold clamping elates facing each other are driven from a maximum spacing into a position of mutual abutment, and vice-versa; and
a piston-cylinder system acting between the counterpressure plate and the displaceable mold clamping plate for generating a required closing pressure;
wherein the piston-cylinder system is acted upon by a fluid mediums said piston-cylinder system, in an abutting position, being retractable and extendable in a horizontal direction from an external space of a closing unit (3) between the counterpressure plate (4) and the displaceable mold clamping plate (5), and wherein the piston-cylinder system is adapted to be filled with or drained with the fluid medium to create a stroke volume, and wherein the system is adapted to receive different amounts of the fluid medium at different time intervals as a pre-tensioning volume for generating the closing pressure so as to be able to adapt a starting height of the piston-cylinder system (2) to different heights of the molding tool and wherein a lower bottom surface (25) of the piston-cylinder system (2) facing the counterpressure plate (4) is directly displaced on the counterpressure plate (4) and a support plate (12) extending an upper cover surface (11) of said counterpressure plate, wherein the piston-cylinder system (2) is connected in a bottom zone in a force-locked manner with a piston rod (51) of a horizontally actuated hydraulic or pneumatic piston-cylinder device (50) via a rigid strutting (54), said piston rod being guided outside of the cylinder device by means of a smooth tube (52, 53) being slotted over its length for the passage of the rigid strutting (54), said tube being horizontally arranged in or underneath the support plate (12) and in the counterpressure plate (4).

16. An injection molding machine with a vertically displaceable closing unit, comprising:
a plate-like lower yoke as a counterpressure plate;
a plate-like upper yoke as a stationary mold clamping plate;
at least three vertically aligned struts connecting the lower yoke and the upper yoke with each other in their marginal zones in a forced-locked manner;
another plate-like element serving as a displaceable mold clamping plate, said another plate-like element being displaceable on the struts;
one or more driving cylinders for displacing said displaceable mold clamping plate, said cylinders being connected to said displaceable mold clamping plate and the counterpressure plate, in a manner such that single- or multi-component molding tool halves arranged on surfaces of the mold clamping plates facing each other are driven from a maximum spacing into a position of mutual abutment, and vice-versa; and
a piston-cylinder system acting between the counterpressure plate and the displaceable mold clamping plate for generating a required closing pressure;
wherein the piston-cylinder system is acted upon by a fluid medium, said piston-cylinder system, in an abutting position, being retractable and extendable in a horizontal direction from an external space of a closing unit (3) between the counterpressure plate (4) and the displaceable mold clamping plate (5), and wherein the piston-cylinder system is adapted to be filled with or drained with the fluid medium to create a stroke volume, and wherein the system is adapted to receive different amounts of the fluid medium at different time intervals as a pre-tensioning volume for generating the closing pressure so as to be able to adapt a starting height of the piston-cylinder system (2) to different heights of the molding tool and wherein a lower bottom surface (25) of the piston-cylinder system (2) facing the counterpressure plate (4) is directly displaced on the counterpressure plate (4) and a support plate (12) extending an upper cover surface (11) of said counterpressure plate, wherein the lower bottom surface (25) of the piston-cylinder system (2) comprises pocket-like recesses (55) each accommodating a nozzle (56), to which a highly pressurized gaseous pressure medium is admitted.

17. The injection molding machine according to claim 16, wherein compressed air is used as the gaseous medium.

* * * * *